(12) United States Patent
Gonzales, Jr.

(10) Patent No.: US 12,026,849 B2
(45) Date of Patent: **\*Jul. 2, 2024**

(54) SOURCE IMAGE PROVIDING MULTIPLE ITEM VIEWS

(71) Applicant: eBay Inc., San Jose, CA (US)

(72) Inventor: Sergio Pinzon Gonzales, Jr., San Jose, CA (US)

(73) Assignee: eBay Inc., San Jose, CA (US)

( \* ) Notice: Subject to any disclaimer, the term of this patent is extended or adjusted under 35 U.S.C. 154(b) by 128 days.

This patent is subject to a terminal disclaimer.

(21) Appl. No.: 17/960,783

(22) Filed: Oct. 5, 2022

(65) Prior Publication Data

US 2023/0024812 A1 Jan. 26, 2023

Related U.S. Application Data

(63) Continuation of application No. 17/101,698, filed on Nov. 23, 2020, now Pat. No. 11,494,876, which is a continuation of application No. 15/637,351, filed on Jun. 29, 2017, now Pat. No. 10,878,538, which is a continuation of application No. 14/973,936, filed on Dec. 18, 2015, now Pat. No. 9,727,957.

(51) Int. Cl.
| | |
|---|---|
| *G06T 3/60* | (2024.01) |
| *G06Q 30/00* | (2023.01) |
| *G06Q 30/0601* | (2023.01) |
| *G06T 1/00* | (2006.01) |
| *G06T 5/00* | (2024.01) |
| *G06T 5/80* | (2024.01) |
| *G06T 15/20* | (2011.01) |
| *H04N 23/81* | (2023.01) |

(52) U.S. Cl.
CPC ............ *G06T 3/60* (2013.01); *G06Q 30/0643* (2013.01); *G06T 1/0007* (2013.01); *G06T 5/80* (2024.01); *G06T 15/205* (2013.01); *G06T 2200/28* (2013.01); *H04N 23/81* (2023.01)

(58) Field of Classification Search
USPC ........................................ 382/274–275, 296
See application file for complete search history.

(56) References Cited

U.S. PATENT DOCUMENTS

| | | | | |
|---|---|---|---|---|
| 7,034,820 B2 * | 4/2006 | Urisaka | ................... | G06T 15/00 345/426 |
| 8,332,284 B1 * | 12/2012 | Runo | ................. | G06Q 30/0643 705/27.2 |
| 8,527,359 B1 * | 9/2013 | Varadhan | ........... | G06Q 30/0641 348/E7.054 |
| 8,963,992 B1 * | 2/2015 | Howlett | ............. | G06Q 30/0627 348/36 |

(Continued)

*Primary Examiner* — Ishrat I Sherali
(74) *Attorney, Agent, or Firm* — FIG. 1 Patents (57) ABSTRACT

According to example embodiments, an Image View Aggregator identifies a frontal view of an item within an image. The Image View Aggregator identifies at least one reflection view of the item within the image. Each reflection view of the item having been captured off a corresponding reflective physical surface. The Image View Aggregator extracts the frontal view of the item and each reflection view of the item from the image. The Image View Aggregator generates a representation of the item based at least on the extracted frontal view of the item and each extracted reflection view of the item.

20 Claims, 7 Drawing Sheets

(56) References Cited

U.S. PATENT DOCUMENTS

| | | | | |
|---|---|---|---|---|
| 9,019,309 B2* | 4/2015 | Jones | ............... | G06T 11/00 |
| | | | | 345/647 |
| 9,286,632 B1* | 3/2016 | Howlett | ............... | H04N 5/222 |
| 9,449,342 B2* | 9/2016 | Sacco | ............... | G06Q 30/0261 |
| 9,716,842 B1* | 7/2017 | Worley | ............... | G06F 3/147 |
| 11,055,910 B1* | 7/2021 | Deng | ............... | G06V 20/647 |
| 11,494,876 B2* | 11/2022 | Gonzales, Jr. | ............... | G06T 1/0007 |

* cited by examiner

SOURCE IMAGE PROVIDING MULTIPLE ITEM VIEWS

CROSS-REFERENCE TO RELATED APPLICATION

This application is a continuation of U.S. patent application Ser. No. 17/101,698, filed Nov. 23, 2020, entitled "SOURCE IMAGE PROVIDING MULTIPLE ITEM VIEWS," which is a continuation of U.S. patent application Ser. No. 15/637,351, filed on Jun. 29, 2017, entitled "SOURCE IMAGE PROVIDING MULTIPLE ITEM VIEWS," now U.S. Pat. No. 10,878,538, issued Dec. 29, 2020, which is a continuation of U.S. patent application Ser. No. 14/973,936, filed on Dec. 18, 2015, entitled "SOURCE IMAGE PROVIDING MULTIPLE ITEM VIEWS," now U.S. Pat. No. 9,727,957, issued Aug. 8, 2017, the disclosures of these applications are incorporated herein by reference in their entirety.

TECHNICAL FIELD

The present application relates generally to the technical field of generating one or more images.

BACKGROUND

Typical electronic commerce ("e-commerce) sites provide users (e.g., sellers) with computer-implemented services for selling goods or services through, for example, a website. For example, a seller may submit information regarding a good or service to the e-commerce site through a web-based interface. Upon receiving the information regarding the good or service, the e-commerce site may store the information as a listing that offers the good or service for sale. Other users (e.g., buyers) may interface with the e-commerce site through a search interface to find goods or services to purchase. For example, some typical e-commerce sites may allow the user to submit a search query that includes, for example, search terms that may be matched by the e-commerce site against the listings created by the sellers. In another example, some typical e-commerce sites may allow the user to post a listing of an item for sale along with an image of the item so that potential buyers can see a current condition of the item.

BRIEF DESCRIPTION OF THE DRAWINGS

The present invention is illustrated by way of example, and not by way of limitation, in the figures of the accompanying drawings in which.

DETAILED DESCRIPTION

Example methods and systems directed to an Image View Aggregator are described. In the following description, for purposes of explanation, numerous specific details are set forth in order to provide a thorough understanding of example embodiments. It will be evident, however, to one skilled in the art that the present invention may be practiced without these specific details.

According to example embodiments, an Image View Aggregator receives an image and identifies a frontal view of an item within the image. The Image View Aggregator identifies at least one reflection view of the item within the image. Each reflection view of the item having been captured off a corresponding reflective physical surface. The Image View Aggregator extracts the frontal view of the item and each reflection view of the item from the image. The Image View Aggregator generates a representation of the item based at least on the extracted frontal view of the item and each extracted reflection view of the item.

Characteristics of each physical reflective surface are embedded in the image. For example, a first reflection view of the item in the image corresponds with first physical characteristics of a first reflective surface. A second reflection view of the item in the image corresponds with second physical characteristics of a second reflective surface The Image View Aggregator extracts the first and the second physical from the image. Such physical characteristics include at least one of a curvature of a physical reflective surface, a distance between the item and a physical reflective surface and an angle of a physical reflective surface with respect to the item.

The characteristics of the first physical reflective surface causes distortion of the item's appearance in the first reflection view in the image. By applying image correction techniques to account for the characteristics, the Image View Aggregator reverses the distortion present in the first reflection view of the item. Upon reversing the distortion, the Image View Aggregator generates a corrected first reflection view. The Image View Aggregator thereby obtains different and accurate views of the item based on receipt of a just a single image of the item.

In an example embodiment, the image of the item was captured while the item was physically placed in proximity to one or more reflective surface. For example, an end-user places a physical item in a physical kit that has a predefined placement position for the physical item itself. The physical kit further includes one or more mirrors. For example, the physical kit includes a first mirror to provide a reflection of one side of the item, a second mirror to provide a reflection of another side of the item. The physical kit can further include a third mirror to provide a reflection of a back portion of the item. Each mirror in the physical kit has various pre-defined characteristics, such as, for example: an amount of concavity, a distance from the predefined placement position and an angle at which the mirror is oriented with respect to the predefined placement position of the item.

The end-user uses a computing device (for example: a mobile device, a digital camera) to capture an image of the physical item as it is situated in the physical kit partially surrounded by the physical kit's mirrors. When the end-user captures the image of a physical item placed within a physical kit with a computing device, the computing device recognizes an identifier (such as a serial number) applied to a non-reflective surface of the physical kit. For example, the computing device scans the identifier from the non-reflective surface prior to capturing the image or utilizes optical character recognition to determine presence of the identifier in the captured image.

Based on the identifier, the computing device accesses a server (or a cloud computing environment) to download various characteristics of each mirror in the physical kit. The computing device embeds the various characteristics of each mirror as metadata in an image header of the image of the item. The metadata further includes an identification of which characteristics of a particular mirror correspond to a reflection captured in the image. That is, a first metadata indicates that it corresponds to a reflection of the item in a particular sector of the image while second metadata indicates that it corresponds to another reflection of the item in a different sector of the image. In another example embodiment, the computing device has the characteristics of each mirror in the physical kit pre-loaded prior to capturing the image of the item in the physical item. In another example, the physical kit has a transmitter that transmits the characteristics of each mirror to the computing device.

The captured image is thereby a single source image that includes a frontal view of the item at the predefined placement position along with all the respective reflections from the physical kit's mirrors. Upon receipt of the single source image, the Image View Aggregator applies edge detection to identify the frontal view of the item and each reflection view of the item in the image. The Image View Aggregator extracts the frontal view of the item and each reflection view of the item from the image. The Image View Aggregator utilizes the physical characteristics of the mirrors present as metadata in the image header in order to reverse any distortion in the image caused as a reflective result of the physical characteristics.

It is understood that example embodiments include the generation of a module(s) to cause a computing device(s) to perform any and/or all of the actions described herein. Once the module(s) is generated, the module(s) is sent for installation on the computing device(s). In one embodiment, the generated modules comprise source code that, when compiled by a computing device(s), creates object code that causes the computing device(s) to perform any or all of the various actions, steps, methods, and/or operations described herein. In other embodiments, the generated modules comprise object code that causes the computing device(s) to perform various actions, steps, methods, and/or operations described herein.

Platform Architecture

Figure 1:
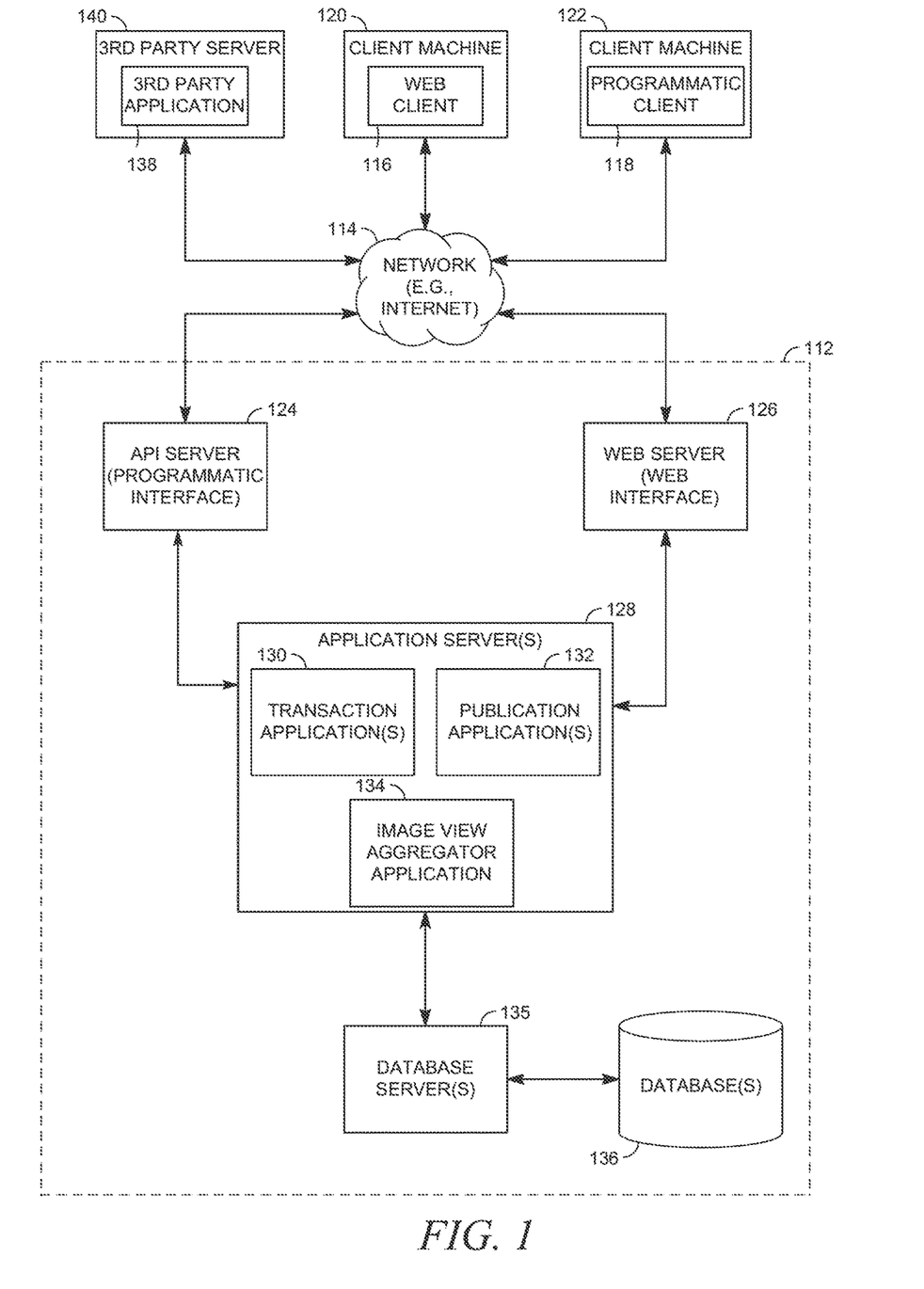
FIG. 1 is a network diagram depicting a publication system, according to one embodiment, having a client-server architecture configured for exchanging data over a network.

FIG. 1 is a network diagram depicting a translation system, according to one embodiment, having a client-server architecture configured for exchanging data over a network. The publication system 100 may be a transaction system where clients, through client machines 120, 122 and a third party server 140, may communicate, view, search, and exchange data with network based publisher 112. For example, the publication system 100 may include various applications for interfacing with client machines and client applications that may be used by users (e.g., buyers and sellers) of the system to publish items for sale in addition to facilitating the purchase and shipment of items and searching for items.

The network based publisher 112 may provide server-side functionality, via a network 114 (e.g., the Internet) to one or more clients. The one or more clients may include users that utilize the network based publisher 112 as a transaction intermediary to facilitate the exchange of data over the network 114 corresponding to user transactions. User transactions may include receiving and processing item and item related data and user data from a multitude of users, such as payment data, shipping data, item review data, feedback data, etc. A transaction intermediary such as the network-based publisher 112 may include one or all of the functions associated with a shipping service broker, payment service and other functions associated with transactions between one or more parties. For simplicity, these functions are discussed as being an integral part of the network based publisher 112, however it is to be appreciated that these functions may be provided by publication systems remotely and/or decoupled from the network based publisher 112.

In example embodiments, the data exchanges within the publication system 100 may be dependent upon user selected functions available through one or more client/user interfaces (UIs). The UIs may be associated with a client machine, such as the client machine 120, utilizing a web client 116. The web client 116 may be in communication with the network based publisher 112 via a web server 126. The UIs may also be associated with a client machine 122 utilizing a client application 118, or a third party server 140 hosting a third party application 138. It can be appreciated in example embodiments the client machine 120, 122 may be associated with a buyer, a seller, payment service provider or shipping service provider, each in communication with the network based publisher 112 and optionally each other. The buyers and sellers may be any one of individuals, merchants, etc.

An application program interface (API) server 124 and a web server 126 provide programmatic and web interfaces to one or more application servers 128. The application servers 128 may host one or more other applications, such as transaction applications 130, publication applications 132, and an Image View Aggregator application 134. The application servers 128 may be coupled to one or more data servers that facilitate access to one or more storage devices, such as the data storage 136.

The transaction applications 130 may provide a number of payment processing modules to facilitate processing payment information associated with a buyer purchasing an item from a seller. The publication applications 132 may include various modules to provide a number of publication functions and services to users that access the network based publisher 112. For example, these services may include, inter alia, formatting and delivering search results to a client. The Image View Aggregator application 134, may include various modules to extract various views of an item within a single image and to correct distortion present in the extracted views to create multiple sub-images of the item. In some embodiments, the Image View Aggregator application 134 automatically creates a listing of the item with the multiple sub-images—even though only a single image was received.

FIG. 1 also illustrates an example embodiment of a third party application 138, which may operate on a third party server 140 and have programmatic access to the network based publisher 112 via the programmatic interface provided by the API server 124. For example, the third party application 138 may utilize various types of data communicated with the network based publisher 112 and support one or more features or functions normally performed at the network based publisher 112. For example, the third party application 138 may receive a copy of all or a portion of the data storage 136 that includes buyer shipping data and act as the transaction intermediary between the buyer and seller with respect to functions such as shipping and payment functions. Additionally, in another example embodiment, similar to the network-based publisher 112, the third party application 138 may also include modules to perform operations pertaining to payment, shipping, etc. In yet another example embodiment, the third party server 140 may collaborate with the network based publisher 112 to facilitate transactions between buyers and sellers, such as by sharing data and functionality pertaining to payment and shipping, etc.

Figure 2:
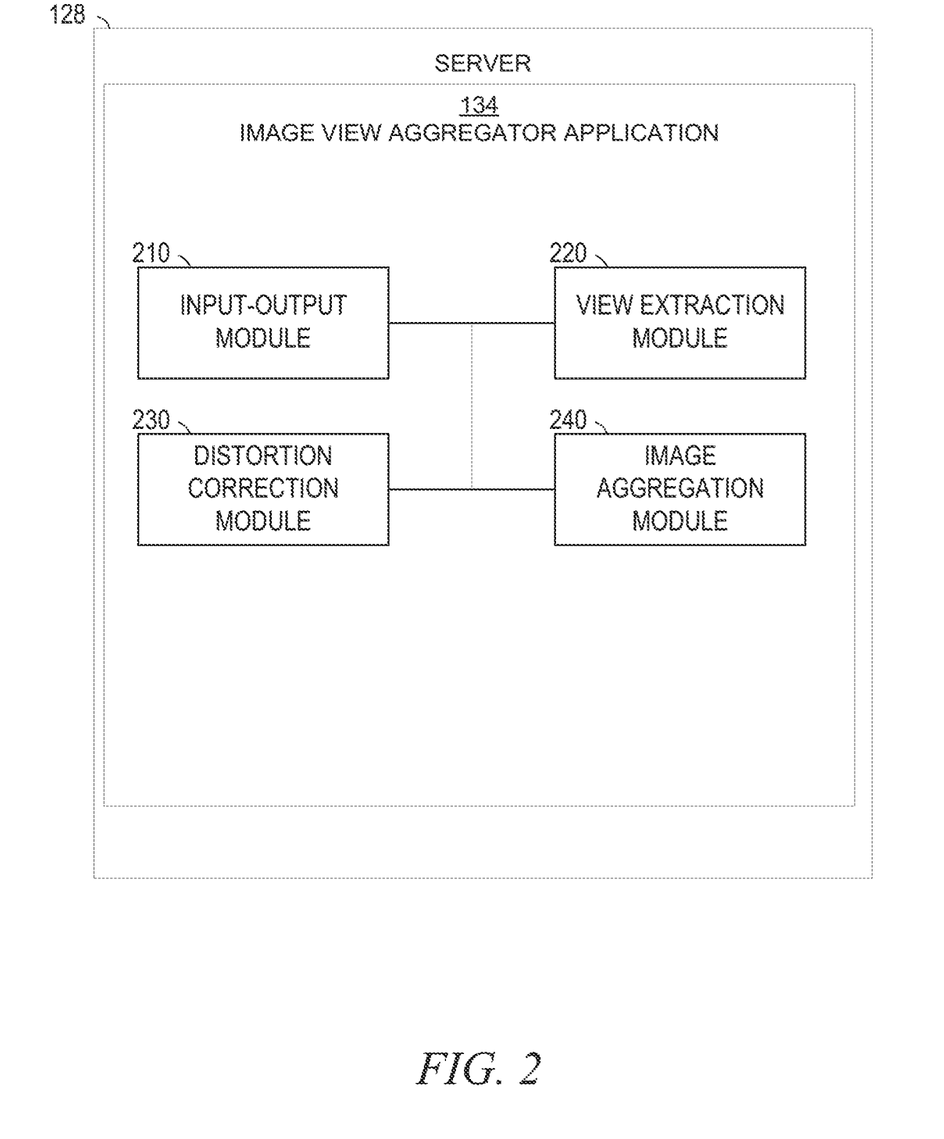
FIG. 2 is a block diagram illustrating components of an Image View Aggregator, according to some example embodiments.

FIG. 2 is a block diagram illustrating components of an Image View Aggregator 134, according to some example embodiments. The components communicate with each other to perform the operations of the Image View Aggregator 134. The Image View Aggregator application 134 is shown as including an input-output module 210, a view extraction module 220, a distortion correction module 230 and an image aggregation module 240, all configured to communicate with each other (e.g., via a bus, shared memory, or a switch).

Any one or more of the modules described herein may be implemented using hardware (e.g., one or more processors of a machine) or a combination of hardware and software. For example, any module described herein may configure a processor (e.g., among one or more processors of a machine) to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The input-output module 210 is a hardware-implemented module which manages, controls, stores, and accesses information regarding inputs and outputs. An input can be an image of an item, which includes a frontal view of the item and one or more reflection views of the item. An output can be a rotatable image based on an aggregation of the frontal view and the one or more reflection views. Such a rotatable image is composed on the extracted frontal view and the one or more reflection views. The output can also be multiple images, wherein a first image is based on the frontal view of the item and a second image is based on a distortion-corrected reflection view of the item.

The view extraction module 220 is a hardware-implemented module which manages, controls, stores, and accesses information regarding extracting from the image a frontal view of the item and the one or more reflection views of the item. The view extraction module 220 applies edge detection techniques to the image in order to identify the frontal view and each reflection view.

The distortion correction module 230 is a hardware-implemented module which manages, controls, stores, and accesses information regarding correcting distortions in each reflection view caused by characteristics of a physical reflective surface. The distortion correction module 230 retrieves characteristics of a physical reflective surface that caused distortion of an appearance of the item in a corresponding reflection view. The distortion correction module 230 applies image correction techniques to the corresponding reflection view to reverse the distortion caused by the characteristics of a physical reflective surface.

The image aggregation module 240 is a hardware-implemented module which manages, controls, stores, and accesses information regarding generating a representation of an item based at least on an extracted frontal view of the item and one or more reflection views of the item.

Figure 3:
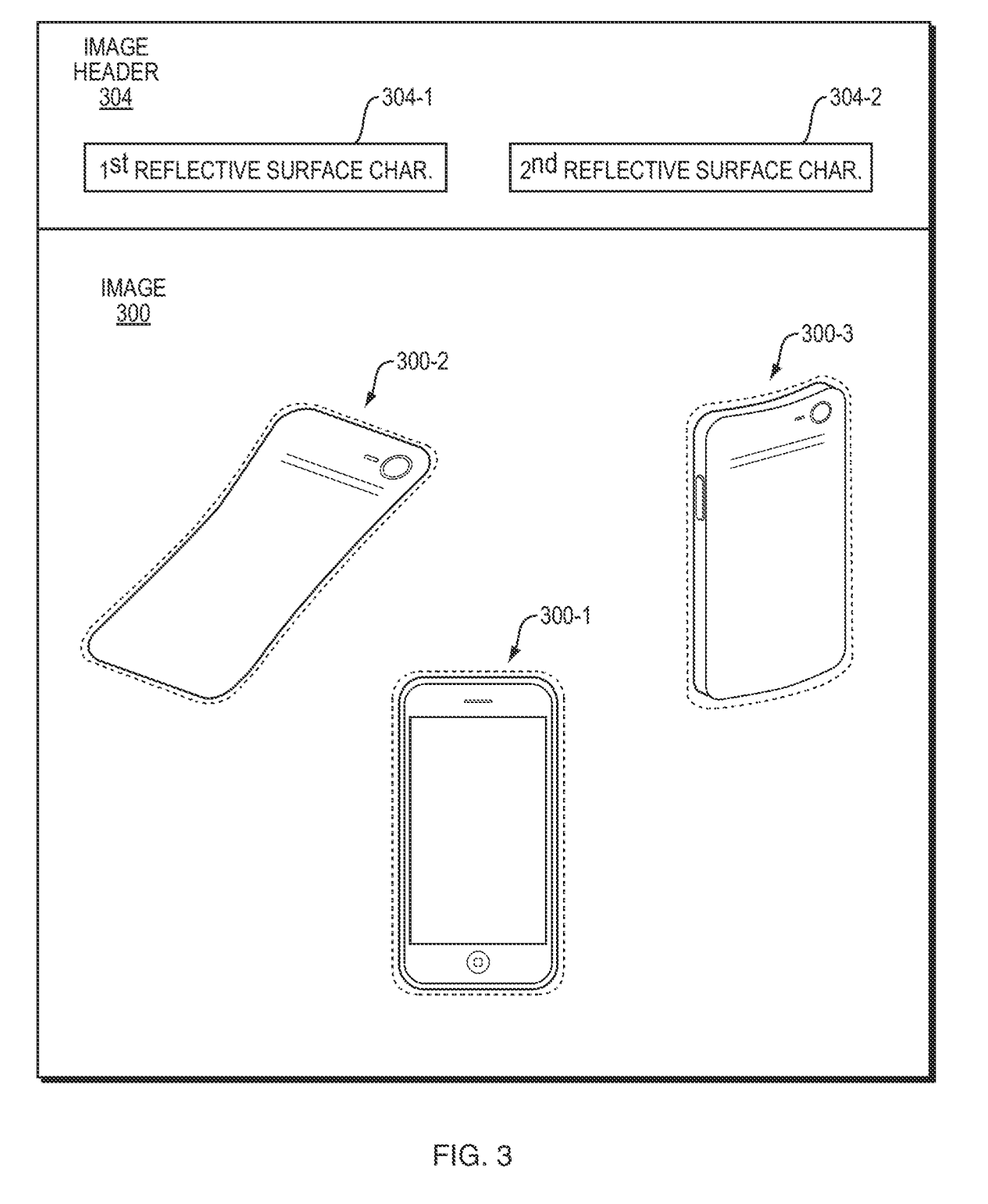
FIG. 3 is a block diagram illustrating an image having multiple reflection views received by the Image View Aggregator, according to some example embodiments.

FIG. 3 is a block diagram illustrating an image having multiple reflection views received by the Image View Aggregator 134, according to some example embodiments.

The Image View Aggregator 134 receives an image 300 having an image header 304. The image 300 includes a frontal view 300-1 of an item, a first reflection view 300-2 of the item and a second reflection view 300-3 of the item. When the image was captured, the item was physically proximate to a first and second physical reflective surface. The first and second reflection views 300-2, 300-3 are therefore reflections captured off of each physical reflective surface.

The image header 304 includes metadata 304-1, 304-2 indicating characteristics of each physical reflective surface. Metadata 304-1 includes characteristics of a first physical reflective surface that corresponds to the first reflection view 300-2. Metadata 304-1 indicates the physical distance between the item and first physical reflective surface, any curvature of the first physical reflective surface and an angle (or orientation) of the first physical reflective surface with respect to the item. Metadata 304-1 further includes an indication as to which sector of the image it applies. That is, metadata 304-1 includes an identification that it applies to the first reflection view 300-2 that appears mostly in the left side (or leftmost third portion) of the image 300. Metadata 304-2 includes characteristics of a second physical reflective surface that corresponds to second reflection view 300-3. Metadata 304-2 indicates the physical distance between the item and second physical reflective surface, any curvature of the second physical reflective surface and an angle (or orientation) of the second physical reflective surface with respect to the item. Metadata 304-2 further includes an indication as to which sector of the image it applies. That is, metadata 304-2 includes an identification that it applies to the second reflection view 300-3 that appears mostly in the right side (or rightmost third portion) of the image 300.

Figure 4:
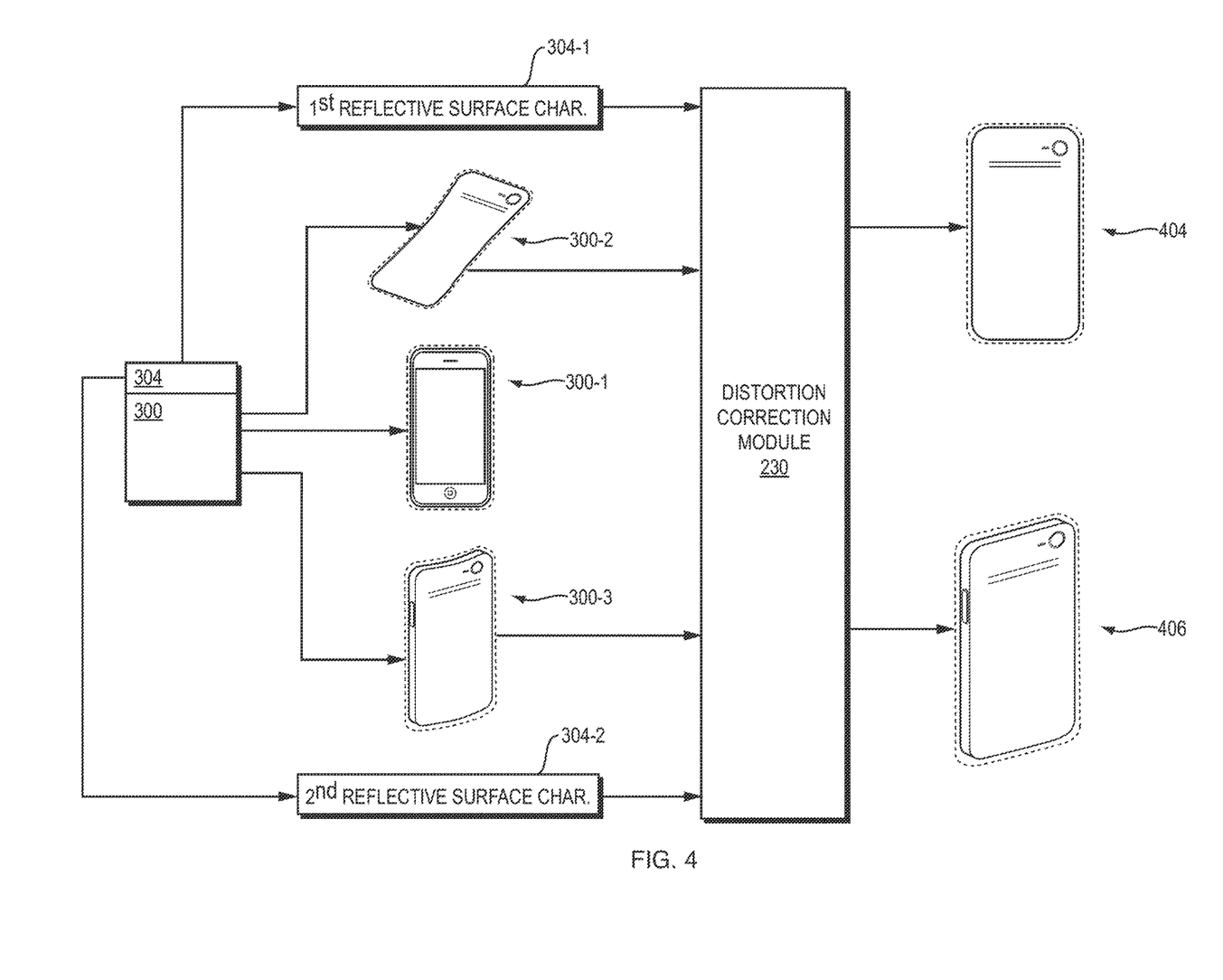
FIG. 4 is a block diagram illustrating the Image View Aggregator correcting distortion in extracted reflection views, according to some example embodiments.

FIG. 4 is a block diagram illustrating the Image View Aggregator 134 correcting distortion in extracted reflection views, according to some example embodiments.

The Image View Aggregator 134 extracts the frontal view 300-1, the first reflection view 300-2 and the second reflection view 300-3 by utilizing edge detection techniques that identify a representation of the item in the image versus a background and foreground of the image. In one example embodiment, the Image View Aggregator 134 applies one or more edge detection techniques to identify a difference between pixels in the image's 300 background and the pixels in the frontal view 300-1, the first reflection view 300-2 and the second reflection view 300-3. That is, the Image View Aggregator 134 identifies that the background of the image consistently includes pixels having a certain color value range, whereas the portions of the image 300 that include the frontal view 300-1, the first reflection view 300-2 and the second reflection view 300-3 have pixels with color value ranges that differ significantly from the background's pixel color value range. By identifying when the pixel color values change abruptly, the Image View Aggregator 134 distinguishes the edges of the frontal view 300-1, the first reflection view 300-2 and the second reflection view 300-3 versus the background of the image 300.

In another example of edge detection, the Image View Aggregator 134 extracts the metadata 304-1, 304-2 embedded in the image header 304 and the metadata 304-1, 304-2 indicates which portions of the image 300 itself includes the frontal view 300-1, the first reflection view 300-2 and the second reflection view 300-3. The Image View Aggregator 134 then applies the pixel color range value comparisons discussed above to further distinguish the boundaries of the frontal view 300-1, the first reflection view 300-2 and the second reflection view 300-2. Based on identifying the boundaries of each respective view 300-1, 300-2, 300-2, the Image View Aggregator crops the views 300-1, 300-2, 300-3 from the image 300, or copies the pixels from the views 300-1, 300-2, 300-3, in order to extract the views from the image 300.

The metadata 304-1, 304-2 further includes the pre-defined characteristics of the various reflective surfaces. For example, the characteristics of the first physical reflective surface caused distortion of the item's appearance in the first reflection view 300-2 in the image 300. The characteristics of the second physical reflective surface caused distortion of the item's appearance in the second reflection view 300-3 in the image 300.

The distortion correction module 230 of the Image View Aggregator 134 applies image correction techniques to the first and second reflection view 300-2, 300-3 to reverse the distortions caused by the respective characteristics of the first and second physical reflective surfaces. For example, the distortion correction module 230 receives the extracted reflection view 300-2 and the metadata 304-1 that includes an angle of the reflective surface that corresponds to reflection view 300-2 and a distance between the physical item and that reflective surface. Using the angle and the distance, the distortion correction module 230 calculates the angle of incidence of the reflective surface with respect to the physical item when the image 300 was captured. The distortion correction module 230 reverses the reflective result of the angle of incidence in the reflection view 300-2 so as to create a corrected first reflection view 404.

The distortion correction module 230 further receives the extracted reflection view 300-3 and the metadata 304-2 that includes an amount of a concavity of the reflective surface that corresponds to reflection view 300-3 and a distance between the physical item and that reflective surface. Using the amount of concavity and the distance, the distortion correction module 230 identifies curved portions of the reflection view 300-3 that can be straightened so as to create a corrected second reflection view 406.

Figure 5:
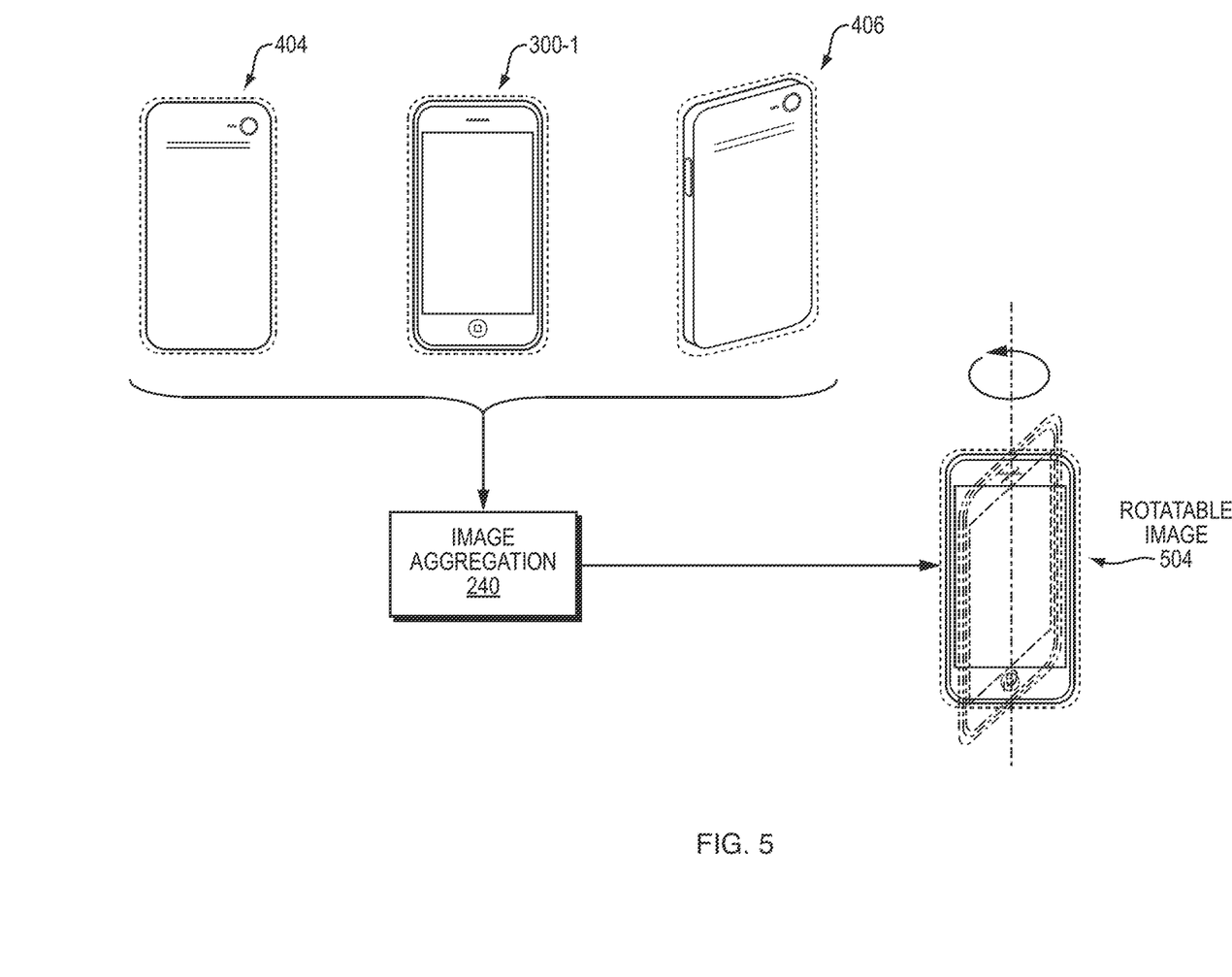
FIG. 5 is a block diagram illustrating the Image View Aggregator generating a rotatable image of an item based on the views extracted from the image, according to some example embodiments.

FIG. 5 is a block diagram illustrating the Image View Aggregator 134 generating a rotatable image of an item based on the views extracted from the image, according to some example embodiments.

The image aggregation module 240 of the Image View Aggregator 134 receives the extracted frontal view 300-1, the corrected first reflection view 404 and the corrected second reflection view 406. The image aggregation module 240 of the Image View Aggregator 134 combines the views 300-1, 404, 406 to generate a rotatable image 504 of the item that provides an end-user with different, selectable vantage points of portions of the item. Each selectable vantage point of the rotatable image 504 is based in part on at least one of the extracted frontal view 300-1, the corrected first reflection view 404 and the corrected second reflection view 406.

Figure 6:
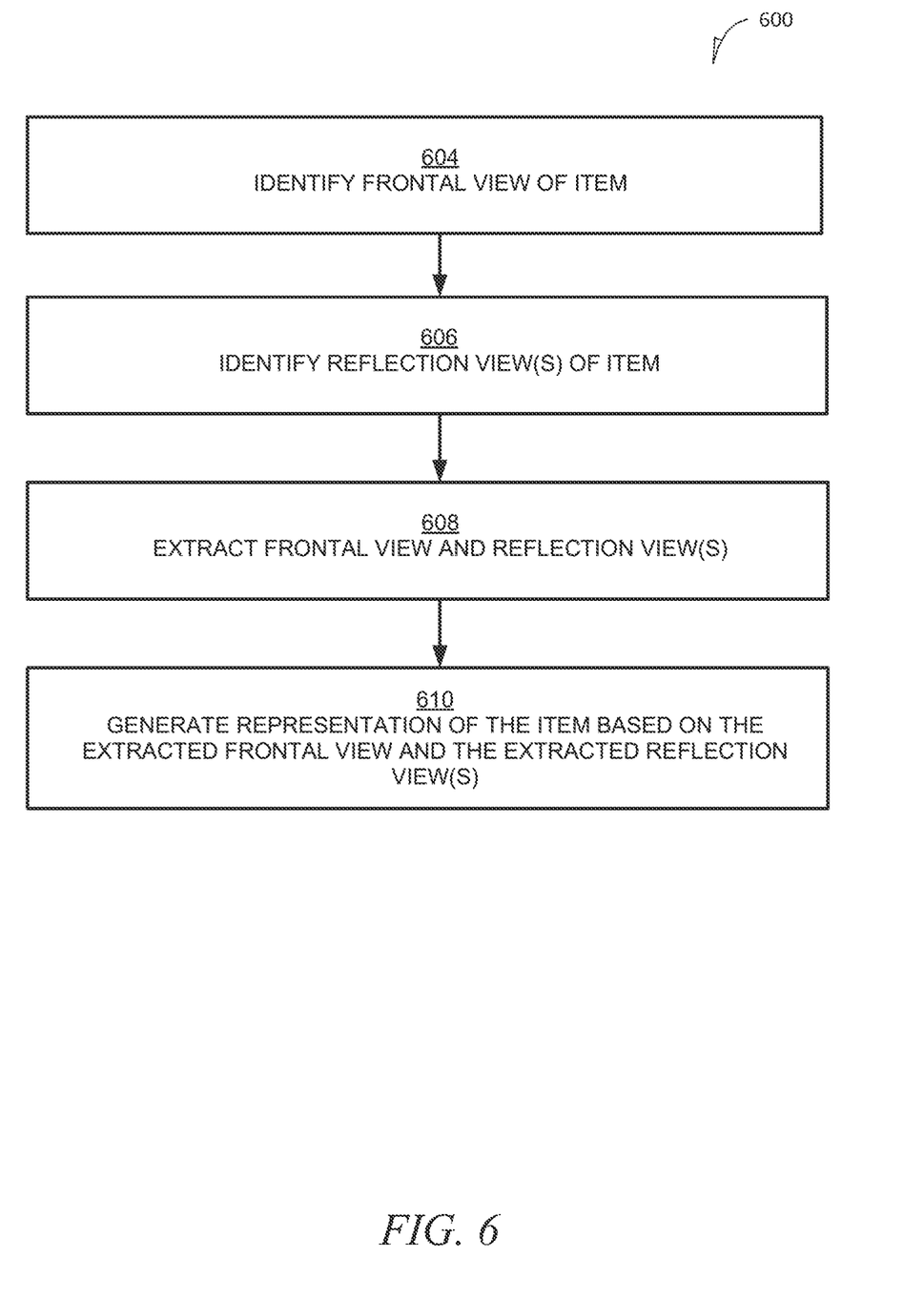
FIG. 6 is a flow diagram illustrating an example of method operations involved in generating a representation of an item based at least on the views of the item extracted from a received image, according to some example embodiments.

FIG. 6 is a flow diagram illustrating an example of method 600 operations involved in generating a representation of an item based at least on the views of the item extracted from a received image, according to some example embodiments.

The Image View Aggregator 134 receives a request from a client device associated with a member account in the publisher system 112. The request includes a serial number identifying a particular physical kit in which a physical item can be placed such that it is partially surrounded by reflective surfaces (such as mirrors). The Image View Aggregator 134 accesses a database that has a listing of physical kits stored according to their respective serial numbers in relation to data of reflective surface characteristics. The Image View Aggregator 134 locates the received serial number in the listing of physical kits. The Image View Aggregator 134 accesses the data of reflective surface characteristics stored in relation to the received serial number and sends the accessed data back to the requesting client device. The client device will thereby use the accessed data to generate metadata to be inserted into a header of an image of an item.

The Image View Aggregator 134 receives an image from the client device associated with the member account. At operation 604, the Image View Aggregator 134 identifies a frontal view of an item within the image. For example, a member account in the publisher system 112 creates a listing for display on the publisher system 112. The listing describes the item. The publisher system 112 receives a single source image from the member account. The Image View Aggregator 134 applies edge detection techniques to identify the frontal view of the item.

At operation 606, the Image View Aggregator 134 identifies at least one reflection view of the item within the image. It is understood that the at least one reflection view of the item captured off a corresponding reflective physical surface. The Image View Aggregator 134 further applies edge detection techniques to identify one or more reflection views of the item in the image received from the member account.

At operation 608, the Image View Aggregator 134 extracts the frontal view of the item and the at least one reflection view of the item from the image. For example, the Image View Aggregator 134 clips the frontal view and the reflection view(s) out of the image such that the clipped frontal view and the clipped reflection views(s) are themselves distinct images.

Image View Aggregator 134 extracts, from the image header, characteristics of a physical reflective surface that corresponds with each extracted reflection view. Such characteristics include at least one of a curvature of the physical reflective surface, a distance between the item and the physical reflective surface and an angle of the physical reflective surface with respect to the item. The characteristics caused a reflective result present in the corresponding extracted reflection view. The reflective result distorts an actual appearance of the item in the extracted reflection view. In another example embodiment, the received single source image includes an image header that provides only an identifier. The identifier corresponds to a physical kit having one or more mirrors. The Image View Aggregator 134 extracts the identifier embedded in the image header. The Image View Aggregator 134 accesses the listing of physical kits to locate pre-defined characteristics of the one or more mirrors of the physical kit associated with the extracted identifier.

The Image View Aggregator applies image correction to the extracted reflection views to reverse the reflective result caused by the characteristics (i.e. distance, curvature, angle) of the corresponding physical reflective surface. The image correction generates a corrected reflection views which include the same content as the corresponding extracted reflection view minus distortion.

At operation 610, the Image View Aggregator 134 generates a representation of the item based at least on the extracted frontal view of the item and the at least one extracted reflection view of the item. The Image View Aggregator 134 includes the extracted frontal view of the item and each corrected reflection view of the item in the listing created by the member account. The Image View Aggregator 134 thereby creates a listing for an item in the publisher system 112 that provides multiple, different views of the item based on receipt of a single image of the item.

Exemplary Computer Systems

Figure 7:
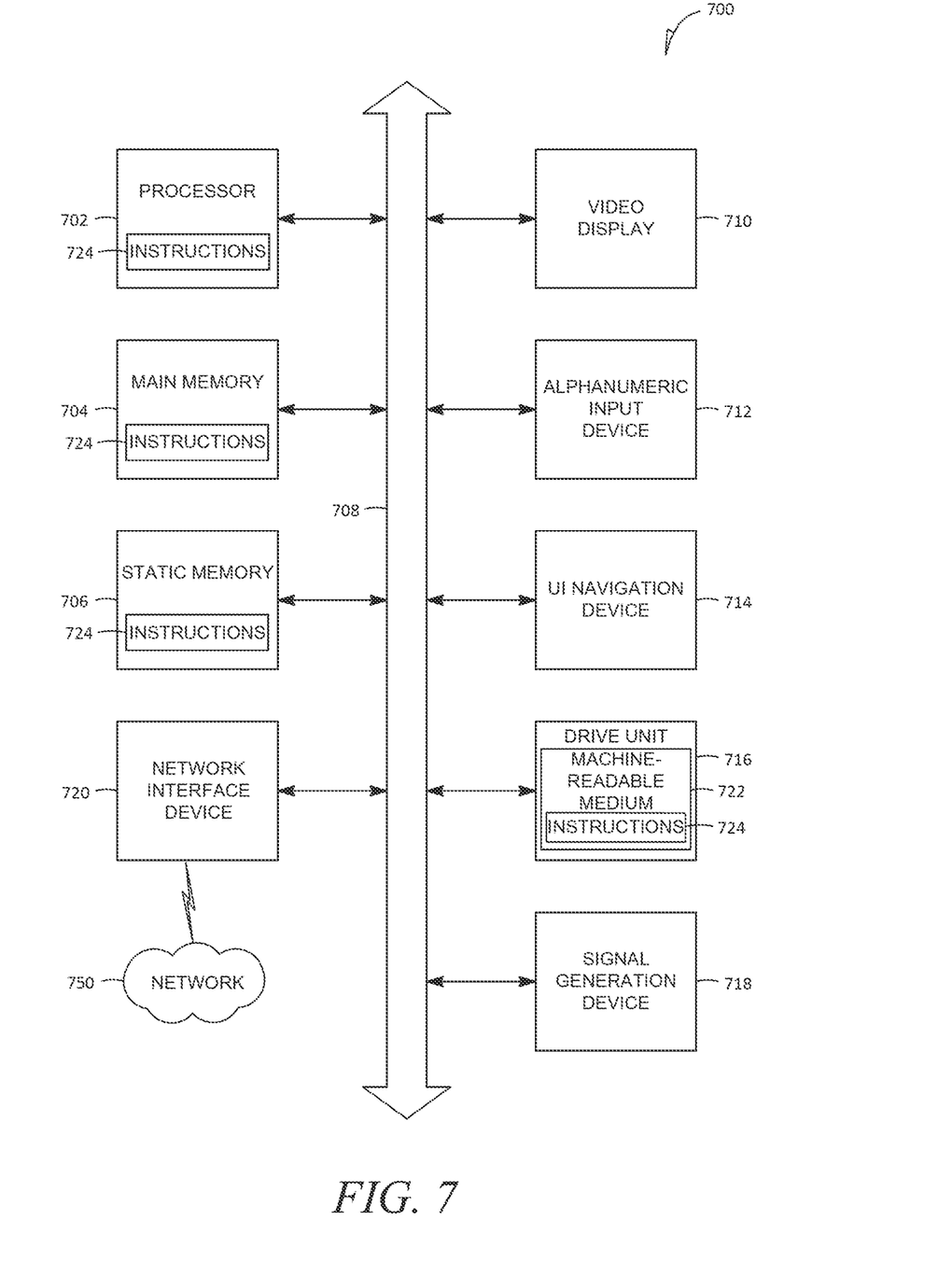
FIG. 7 shows a diagrammatic representation of machine in the example form of a computer system within which a set of instructions may be executed causing the machine to perform any one or more of the methodologies discussed herein.

FIG. 7 shows a diagrammatic representation of machine in the example form of a computer system 700 within which a set of instructions may be executed causing the machine to perform any one or more of the methodologies discussed herein. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 508. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions and data structures (e.g., software 724) embodying or utilized by any one or more of the methodologies or functions described herein. The software 724 may also reside, completely or at least partially, within the main memory 704 and/or within the processor 702 during execution thereof by the computer system 700, the main memory 704 and the processor 702 also constituting machine-readable media.

The software 724 may further be transmitted or received over a network 726 via the network interface device 720 utilizing any one of a number of well-known transfer protocols (e.g., HTTP).

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in example embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Furthermore, the following claims are hereby incorporated into the Detailed Description, with each claim standing on its own as a separate embodiment.

What is claimed is:

1. An apparatus comprising:
 a hardware processor; and
 a memory storing instructions that, when executed by the hardware processor, cause the apparatus to perform operations comprising:
  receiving a first image of a first surface of an item and a second image of a first reflective surface that includes a second surface of the item;
  generating, in response to the receiving, a rotatable image of the item including a frontal view and at least one reflection view, the frontal view generated based at least in part on the first image of the item and the at least one reflection view generated to correct at least in part distortion caused by the first reflective surface; and
  transmitting the rotatable image of the item including the frontal view of the item and the at least one reflection view.

2. The apparatus of claim 1, wherein the rotatable image is included in a listing of a publication system for the item.

3. The apparatus of claim 1, the operations further comprising:
 receiving metadata indicative of a characteristic of the first reflective surface associated with the second image, wherein the rotatable image is generated based at least in part on the metadata.

4. The apparatus of claim 3, wherein the metadata indicates an angle of the first reflective surface.

5. The apparatus of claim 3, wherein the metadata indicates a distance to the first reflective surface.

6. The apparatus of claim 3, wherein the metadata indicates a curvature of the first reflective surface.

7. The apparatus of claim 1, the operations further comprising:
 correcting, at least in part, distortion caused by at least one physical characteristic of the first reflective surface using the at least one reflection view.

8. The apparatus of claim 1, the operations further comprising:
 receiving a third image of a second reflective surface; and generating an additional reflection view corresponding to the third image to correct, at least in part, distortion caused by the second reflective surface, wherein the rotatable image of the item includes the additional reflection view corresponding to the third image.

9. A computer-implemented method, comprising:
receiving, by one or more processors, a first image of a first surface of an item and a second image of a first reflective surface that includes a second surface of the item;
generating, by the one or more processors in response to the receiving, a rotatable image of the item including a frontal view and at least one reflection view, the frontal view generated based on the first image of the item and the at least one reflection view generated to correct at least in part distortion caused by the first reflective surface; and
transmitting, by the one or more processors, the rotatable image of the item including the frontal view of the item and the at least one reflection view.

10. The computer-implemented method of claim 9, wherein the rotatable image is included in a listing of a publication system for the item.

11. The computer-implemented method of claim 9, further comprising:
receiving metadata indicative of a characteristic of the first reflective surface associated with the second image, wherein the rotatable image is generated based at least in part on the metadata.

12. The computer-implemented method of claim 11, wherein the metadata indicates an angle of the first reflective surface.

13. The computer-implemented method of claim 11, wherein the metadata indicates a distance to the first reflective surface.

14. The computer-implemented method of claim 11, wherein the metadata indicates a curvature of the first reflective surface.

15. The computer-implemented method of claim 9, further comprising:
correcting, at least in part, distortion caused by at least one physical characteristic of the first reflective surface using the at least one reflection view.

16. The computer-implemented method of claim 9, further comprising:
receiving a third image of a second reflective surface; and
generating an additional reflection view corresponding to the third image to correct, at least in part, distortion caused by the second reflective surface, wherein the rotatable image of the item includes the additional reflection view corresponding to the third image.

17. A non-transitory computer-readable medium storing code, the code comprising instructions executable by a processor to cause an apparatus to perform operations comprising:
receiving a first image of a first surface of an item and a second image of a first reflective surface that includes a second surface of the item;
generating, in response to the receiving, a rotatable image of the item including a frontal view and at least one reflection view, the frontal view generated based on the first image of the item and the at least one reflection view generated to correct at least in part distortion caused by the first reflective surface; and
transmitting the rotatable image of the item including the frontal view of the item and the at least one reflection view.

18. The non-transitory computer-readable medium of claim 17, wherein the rotatable image is included as a listing of a publication system listing the item.

19. The non-transitory computer-readable medium of claim 17, wherein the instructions are further executable by the processor to cause the apparatus to perform operations comprising:
receiving metadata indicative of a characteristic of the first reflective surface associated with the second image, wherein the rotatable image is generated based at least in part on the metadata.

20. The non-transitory computer-readable medium of claim 17, wherein the instructions are further executable by the processor to cause the apparatus to perform operations comprising:
correcting, at least in part, distortion caused by at least one physical characteristic of the first reflective surface using the at least one reflection view.

* * * * *